Sept. 28, 1948.  L. E. BLAZEY  2,450,228
CASTER UNIT
Filed Sept. 17, 1945

INVENTOR.
LAWRENCE E. BLAZEY
BY
Kwis Hudson, Boughton & Williams
ATTORNEYS

Patented Sept. 28, 1948

2,450,228

UNITED STATES PATENT OFFICE 2,450,228

CASTER UNIT

Lawrence E. Blazey, Bay Village, Ohio, assignor, by mesne assignments, to Office Furniture & Fixtures, Inc., Washington, D. C., a corporation of Delaware Application September 17, 1945, Serial No. 616,898

2 Claims. (Cl. 16—29)

This invention relates to casters and caster mountings for use on articles of furniture and other movable objects and, as one of its purposes, aims to provide an improved and simplified construction for a caster unit or assembly of this kind.

Another object of this invention is to provide an improved caster unit embodying a novel mounting means enabling the unit to be readily applied to a chair leg or the like and wherein the mounting means enhances the appearance of the chair and forms a protective covering against scuffing or marring.

A further object of the present invention is to provide an improved caster unit of the character mentioned, in which the mounting means is a shell having a laterally opening recess for receiving a portion of the member or leg to be supported and a depending hollow portion in which the caster member is located with at least the upper portion thereof concealed.

The invention can be further briefly summarized as consisting in certain novel combinations and arrangements of parts hereinafter described and particularly set out in the appended claims.

In the accompanying sheet of drawings.

Figure 1:
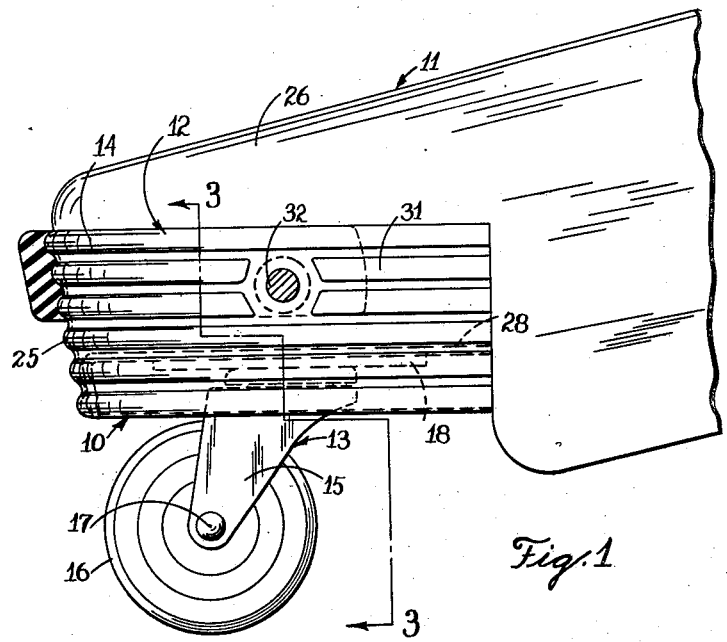
Fig. 1 is a side elevation showing a caster unit embodying the present invention and applied to a chair leg.
Figure 2:
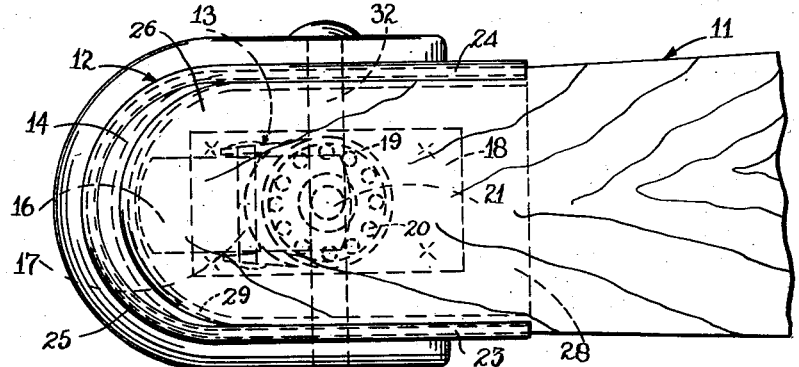
Fig. 2 is a top plan view thereof.

The present invention provides an improved caster unit 10 which will be described in detail hereinafter and which is here shown applied to a leg 11 of a swivel chair, although it can be applied to various other objects and uses. The caster unit 10 comprises in general a mounting member 12 and a caster member 13 connected thereto so that these members constitute an assembly or unit which can be readily handled and applied to an object to be supported such as the chair leg 11.

The caster member 13 can be a roller-carrying member or caster of a conventional construction and, in this instance, is shown as being a conventional so-called "flat plate" caster. The caster 13 comprises a forked bracket 15 in which a suitable roller 16 is rotatably mounted on an axle or shaft 17. This caster also includes a substantially flat plate 18 at the top thereof and on the underside of which is fixed a dished bearing race 19 containing an annular series of antifriction ball elements 20. The bracket 15 is swivelly connected to the plate 18 by means of a riveted pivot pin 21 which extends through the plate and bracket and through the dished bearing race 19. The top of the bracket 15 is annularly grooved as indicated at 22 so as to provide a lower race for the ball elements 20.

The mounting member 12 provides a mounting for the caster member 13 and a means for connecting the caster with the member to be supported. This mounting member is in the form of a metal shell 14 which can be of any desired contour, size or shape, depending upon the features and characteristics of the object or member to which it is to be attached. In this instance the shell 14 comprises a laterally elongated sheet metal structure having a pair of spaced side walls 23 and 24 which are connected by a rounded and tapered integral end wall 25. In this case the shell is open at the top thereof and at its inner end so as to receive the chair leg 11 which is here shown as being provided with a laterally projecting or overhanging arm portion 26 which extends into and substantially fills the recess or opening of the shell.

Figure 3:
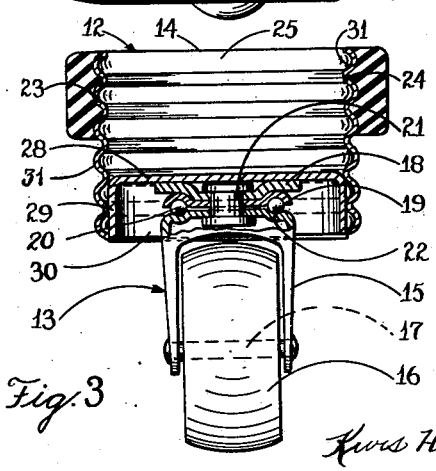
Fig. 3 is a transverse sectional view taken as indicated by line 3—3 of Fig. 1 but showing the caster unit detached from the chair leg.

The bottom wall of the shell 14 is formed by a transversely extending metal plate 28 which is recessed upwardly into the shell, as shown in Fig. 3, so that the bottom wall formed by this plate is located a substantial distance above the lower edge of the side and end walls 23, 24 and 25. The plate 28 is provided with a down-turned flange or flanges 29 extending along its sides and across the outer end thereof and is mounted in the shell 14 by having such flange or flanges welded or otherwise connected to the walls of the shell.

The caster 13 is disposed beneath the bottom wall 28 of the shell 14 and is connected to this wall by suitable connecting means such as by having the top plate 18 welded against the underside thereof. The roller unit is connected with the bottom wall 28 in a centered location thereon so that the top plate 18 extends longitudinally of the shell 14 and without tendency for the load applied to the caster unit 10 to cause tilting thereof.

It is important to note that with the construction just described above the upper portion of the caster 13, that is to say, the plate 18, pivot member 21 and the upper portion of the wheel bracket 15 including the antifriction bearing, are housed and concealed in the recess 30 formed in the underside of the shell 14 by having the bottom plate 28 recessed upwardly thereinto.

Since the upper portions of the caster member 13 are thus concealed by the shell 14 it is possible to use a conventional and relatively inexpensive caster member without detracting from the ornamental and attractive appearance of the caster unit 10.

To further improve the appearance of the caster unit 10 the metal shell 14 of the mounting member 12 is preferably constructed with corrugations 31 or other ornamental configurations in its end and side walls. These corrugations or configurations also serve to reinforce and stiffen the walls so that even though constructed of sheet metal the shell 14 will have adequate strength and rigidity. When the caster unit 10 is mounted on a chair leg as shown in the drawing, the metal shell 14 extends around and covers a substantial portion of the extreme end of the leg and protects the portion thereof which would otherwise be prone to scuffing or marring.

The caster unit 10 also includes a means for retaining the same on the chair leg 11. This may be any suitable connecting means such as the bolt 32 which extends transversely through the leg and through the side walls 23 and 24 of the metal shell 14. It will be noted that since a portion of the chair leg 11 conforms to and substantially fills the recess of the mounting member 12 and the latter is thus prevented from sidewise or endwise shifting, the single bolt 32 is all that is needed to complete the connection between the caster unit and leg.

From the foregoing description and the accompanying drawing it will now be readily understood that the present invention provides an improved and simplified form of caster unit for use on chairs and other objects and which also enhances the appearance and forms a protective covering against scuffing or marring. It will also be seen that as explained above, the mounting member embodied in the improved caster unit is constructed so as to house and conceal the upper portion of the caster member, thus permitting the use of an inexpensive conventional form of caster in the assembly.

Although the improved caster unit has been illustrated and described in more or less detail herein, it should be understood, however, that the invention is not correspondingly limited in scope but includes all changes and modifications coming within the spirit of the invention and the scope of the appended claims.

Having thus described my invention, I claim:

1. In combination with a caster unit, a laterally elongated generally U-shaped metal shell open at the top and at one end thereof and provided with side walls adapted to laterally receive therebetween a portion of a wooden chair leg or the like, said side walls depending below the leg receiving portion of said shell, a bottom wall extending transversely of said shell at a point above the lower edges of said side walls a downwardly extending flange on said bottom wall and attached to said side walls whereby a caster member may be attached to said bottom wall and carried by said shell.

2. In combination with a caster unit, a laterally elongated generally U-shaped corrugated metal shell open at the top and at one end thereof and provided with side walls adapted to receive therebetween a portion of a wooden chair leg or the like, said side walls depending below the leg receiving portion of said shell, a bottom wall extending transversely of said shell positioned at a point above the lower edges of said side walls a depending flange carried by said bottom wall and bonded to said side walls, and means adapted to extend transversely through said shell and the chair leg received therein for securing said shell to the chair leg and preventing endwise shifting of the shell with respect to the chair leg.

LAWRENCE E. BLAZEY.

REFERENCES CITED

The following references are of record in the file of this patent:

UNITED STATES PATENTS

| Number | Name | Date |
|---|---|---|
| 115,060 | Jones | May 23, 1871 |
| 329,275 | Clark | Oct. 27, 1885 |
| 331,211 | Osborn, et al. | Nov. 24, 1885 |
| 335,148 | Romadka | Feb. 2, 1886 |
| 804,809 | Graham | Nov. 14, 1905 |
| 934,005 | Neuberth | Sept. 14, 1909 |
| 1,222,414 | Klinsmann | Apr. 10, 1917 |
| 1,849,835 | Jantzen, et al. | Mar. 15, 1932 |